(12) United States Patent
Buck (10) Patent No.: US 7,482,970 B2
(45) Date of Patent: Jan. 27, 2009

(54) METHOD FOR PRODUCING MAP IMAGES OF SURFACE SEA CURRENT VELOCITY VECTORS AND ALTIMETRIC RADAR SYSTEM USING THE METHOD

(75) Inventor: Christopher Hereward Buck, Le Weteringbrug (NL)

(73) Assignee: Agence Spatiale Europeenne, Paris (FR)

( * ) Notice: Subject to any disclaimer, the term of this patent is extended or adjusted under 35 U.S.C. 154(b) by 137 days.

(21) Appl. No.: 11/435,642

(22) Filed: May 17, 2006

(65) Prior Publication Data

US 2006/0262004 A1  Nov. 23, 2006

(30) Foreign Application Priority Data

May 18, 2005  (FR) ................... 05 04995

(51) Int. Cl.
*G01S 13/00* (2006.01)
(52) U.S. Cl. .................. 342/25 A; 342/25 A; 342/191; 342/104
(58) Field of Classification Search ............ 342/25
See application file for complete search history.

(56) References Cited

U.S. PATENT DOCUMENTS

| 3,185,981 | A | * | 5/1965 | Bath et al. .............. 342/100 |
| 4,172,255 | A | * | 10/1979 | Barrick et al. ............ 342/26 D |
| 5,659,318 | A | * | 8/1997 | Madsen et al. ............ 342/25 C |

OTHER PUBLICATIONS

First Demonstration of Surface Currents Imaged by Hybrid Along- and Cross-Track Interferometric SAR, By Siegmund et al., published by Transactions on Geoscience and remote sensing IEEE, USA, vol. 42, No. 3, pp. 511-519, Mar. 2004.*
"Joint Along-cross Track Interferometry of Ocean Waves", By Thompson et al., published by Journal of GeoPhysical Research vol. 98, No. C6, pp. 10-269, Jun. 15, 1993.
"Joint Along-Across Track Interferometry of Ocean Waves", By Lehner et al., published by International Geoscience and Remote Sensimg Symposium, NY, vol. 1 of 7, pp. 581-583, Jul. 9, 2001.
"A Pod-Based Dual-Beam Interferometric Radar for Ocean Surface Current Vector Mapping", By Frasier et al., published by International Geoscience and Remote Sensing Symposium, vol. 1 of 7, pp. 561-563, Jul. 9, 2001.

(Continued)

*Primary Examiner*—Thomas H Tarcza
*Assistant Examiner*—Timothy A Brainard
(74) *Attorney, Agent, or Firm*—Bachman & LaPointe, P.C.

(57) ABSTRACT

A method for producing map images of current velocity vectors at the surface sea is described in which beams of electromagnetic waves are emitted towards the surface using a system, towards the left forward and right forward sides of the track of the system, and towards the left aft and right aft sides of the track, from two antennas at a distance from each other along the direction of the track and along a direction perpendicular to the track, and values of roll angle and length of the antenna base connecting the two antennas are determined using differential interferometries applied to the electromagnetic waves reflected by the surface between beams emitted forwards and backwards, the map images being built up using an along-track type differential interferometry, using roll angle and antenna base length values obtained.

10 Claims, 4 Drawing Sheets

OTHER PUBLICATIONS

"Study of Concepts for Radar Interferometry From Satellites for Ocean (and Land) Applications", By Romeiser et al., Online XP002363347 Extrait de l'Internet: URL:http://www.ifm.uni-hamburg.de/wwwrs/koriolis.htm, Apr. 2002.

First Demonstration of Surface Currents Imaged by Hybrid Along- and Cross-Track Interferometric SAR, By Siegmund et al., published by Transactions on Geoscience and remote sensing IEEE, USA, vol. 42, No. 3, pp. 511-519, Mar. 2004.

* cited by examiner

METHOD FOR PRODUCING MAP IMAGES OF SURFACE SEA CURRENT VELOCITY VECTORS AND ALTIMETRIC RADAR SYSTEM USING THE METHOD

BACKGROUND OF THE INVENTION (1) Field of the Invention

This invention relates to the domain of altimetric measurements and more particularly the determination of surface ocean currents using altimetric radar onboard satellites.

It is particularly but not exclusively applicable to the study of surface sea currents in coastal regions.

(2) Prior Art

Such a study is desirable for many reasons. Coastal waters are extremely dynamic regions in which submarine relief and particularly navigation channels can vary significantly over relatively short periods. Furthermore, the study of surface currents provides a means of determining the distribution of pollutants and the flow of cold polar water and water derived from ice melt.

Conventional satellite altimetric radar can scan a relatively narrow band also called a "swath" on the earth's surface, typically a few kilometres wide. This means that only a small fraction of the ocean surface can be observed during each orbital revolution, with a considerable space between two adjacent passes. At temperate latitudes, the space between passes is very much greater than the width of the scanned surface. The result is that it is necessary to make assumptions and approximations in order to deduce ocean circulation models from these observations and to solve turbulence problems.

INSAR (Interferometric Synthetic Aperture Radar) systems are also used to make altimetric measurements. Such a system comprises two antennas spaced at a fixed distance from each other, either parallel (ATI—Along-Track Interferometry) or perpendicular (XTI—Cross-Track Interferometry) to the track of the platform on which the system is onboard.

Along-Track Interferometry (ATI) systems are conventionally used to make current measurements. They are based on use of the fact that the phase of signals back-scattered from a moving target varies as a function of time at a rate that is determined by the speed of the sighting axis of the target (this effect corresponds to the Doppler frequency shift). This system is capable of acquiring two complex SAR (Synthetic Aperture Radar) images of a region with a short time offset, which shows up a phase shift proportional to the time offset and the rate of the phase shift. In this way, the measured phase shift can be converted into a target speed. For example, such a system is described in document [1] "Synthetic aperture radar interferometry applied to ship-generated waves in the 1989 Loch Linnhe Experiment", D. R. Thompson & J. R. Jensen, J. Geophys. Res., 98, 10, 259-10, 269, 1993.

Cross-Track Interferometry (XTI) systems use two SAR antennas at a spacing from each other in a direction perpendicular to the track. In this case, the phase shifts depend on the topography of the illuminated area. Therefore, XTI systems are used essentially for the generation of land surface elevation models. They cannot be used for mapping the speed of mobile targets. However at sea, an XTI system can be used to measure sea level variations, and therefore to demonstrate current phenomena at medium scale. XTI systems have the advantage that they can scan wider bands with an equivalent precision and spatial resolution than conventional altimetry systems. Furthermore, XTI systems do not require that corrections due to atmospheric conditions are applied.

Figure 1:
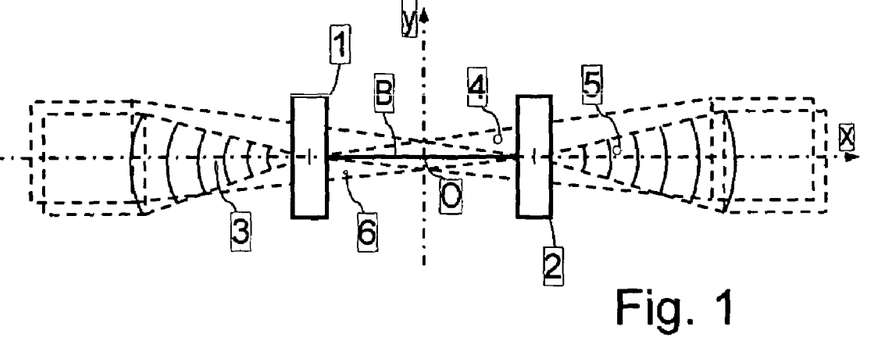
FIG. 1 diagrammatically shows a top view of an interferometric radar system according to prior art, and the shape of beams emitted by this system.

A Wide Swath Ocean Altimeter (WSOA) interferometer system was thus proposed capable of scanning a band about 200 km wide. This system is shown diagrammatically in FIG. 1 showing a top view of the antennas and the shape of the beams that they emit. As shown in this figure, this system comprises two interferometric antennas 1, 2 aiming at the nadir, fixed to the ends of an arm with length B called an "antenna base" arranged perpendicular to the track (along the y axis) of the satellite. Each antenna emits two beams 3, 4 and 5, 6 scanning two bands approximately 100 km wide, on each side of the trace of the satellite track on the ground. A map of the surface sea can be produced using Cross-Track Interferometry (XTI) to determine surface slopes providing useful information about ocean currents, so as to create a better model of the global temperature and salinity of the oceans and local phenomena.

However, neither conventional altimeters nor the WSOA system are capable of studying coastal regions due to their low precision and insufficient time sampling, and in any case are unsuitable for the large variability of these regions both in space and in time.

In "First Demonstration of Surface Currents Imaged by Hybrid Along—and Cross-Track Interferometry SAR", R. Siegmund et al. IEEE Transactions on Geoscience and Remote Sensing, Vol. 42, No. 3, pp. 511-519, March 2004, a system combining ATI Along-Track and XTI Cross-Track Interferometry techniques was envisaged to simultaneously obtain altitude and velocity measurements of surface currents. This system includes two antennas with an antenna base with a component along the line of the track and a component perpendicular to this line. This system can be used to obtain surface current velocities from combined interferometric phases and a geometric phase interpretation model only along a direction perpendicular to the track. Therefore, this system cannot be used to obtain a map of surface current velocities. Furthermore, the precision obtained using this system onboard an aircraft is of the order of 20 cm/s. If this system is onboard a satellite at an altitude of several hundred km, the precision obtained is unsuitable for the study of surface currents in coastal regions.

In "*Study on Concepts for Radar Interferometry from Satellites for Ocean (and Land) Applications (Koriolis)*", R. Romeiser et al., *DLR Study* 50EE000, April 2002, it was also envisaged to combine the ATI and XTI techniques. This document shows that there is an optimum angle of attack of beams output from antennas equal to between 30° and 45°, to make surface current measurements with a relatively high precision. However, application of this constraint can degrade performances of the system concerning measurement of altitudes. It is also preferable to keep the scanned surface close to the nadir so that altimetric measurements made on a wide swath remain compatible with altimetric measurements made using a conventional altimeter pointing towards the nadir.

SUMMARY OF THE INVENTION

The purpose of this invention is to eliminate these disadvantages. Thus, one purpose of the invention is to produce map images of current velocity vectors at the surface sea, in regions with a large variability both in terms of space and time, such as coastal regions.

This objective is achieved by the use of a method for producing map images of surface sea current velocity vectors from a system running along a track above the surface, the method comprising steps consisting in:

emitting beams of eletromagnetic waves to the surface from at least two antennas at a distance from each other along the direction of the track and along a direction perpendicular to the track, and making an Along-Track type differential interferometry using electromagnetic waves reflected by the surface, to build up map images of surface sea current velocity vectors.

According to the invention, the beams of electromagnetic waves are emitted towards the left forward and right forward of the track and towards the left aft and right aft of the track, the method also comprising steps consisting in:

making differential interferometries between beams emitted forwards and backwards, determining values of roll angle and length of the antenna base connecting the two antennas, starting from the differential interferometries, and using the values of roll angle and length of the antenna base obtained to build up the map images of surface sea current velocity vectors.

According to one embodiment of the invention, the method also comprises steps consisting in using the electromagnetic waves reflected by the surface to perform a cross-track type interferometry to build up map images of surface altitude, using the values of roll angle and antenna base length obtained.

According to one embodiment of the invention, the values of roll angle and antenna base length connecting the two antennas are determined by comparing the differential interferometries between beams emitted forwards and backwards, and towards the left and towards the right respectively, with differential interferometries obtained using an equivalent system without any roll angle and antenna base length estimating errors.

According to one embodiment of the invention, the beams of electromagnetic waves are emitted to the surface at angles of attack of between 30° and 40° and are oriented in azimuth with respect to the track direction, forwards and backwards by an angle of close to 45°.

According to one embodiment of the invention, the beams of electromagnetic waves are emitted to the surface from an altitude of approximately 500 km and scan over the surface approximately 100 km wide strips to the right and to the left of the ground trace of the track.

The invention also relates to a system for producing map images of surface sea current velocity vectors using a system passing along a track above the surface, comprising:

at least two antennas at a distance from each other in the along-track direction and in the cross-track direction, and means for using the electromagnetic waves reflected by the surface to create a differential along-track type interferometry to build up map images of surface sea current velocity vectors.

According to the system, the invention also comprises:

means for using antennas to emit beams of electromagnetic waves towards the forward left and forward right of the track and towards the aft left and the aft right of the track, means for carrying out differential interferometries between beams emitted forwards and backwards, means for determining values of roll angle and antenna base length connecting the two antennas from the differential interferometries, and along-track type differential interferometry means, using roll angle and antenna base length values obtained to build up the map images of surface sea current velocity vectors.

According to one embodiment of the invention, the system also comprises means for carrying out a cross-track type interferometry from the electromagnetic waves reflected by the surface, using roll angle and antenna base length values obtained to build up map images of the surface altitude.

According to one embodiment of the invention, the system also comprises means of comparison of differential interferometries between beams emitted forwards and backwards, towards the right and to the left respectively, with differential interferometries obtained using an equivalent system with no estimating errors of roll angle and antenna base length to determine values of the roll angle and the antenna base length connecting the two antennas.

In one embodiment of the invention, the beams of electromagnetic waves are emitted to the surface at angles of attack of between 30° and 40° and are oriented in azimuth with respect to the direction of the track towards the front and towards the back by an angle close to 45°.

According to one embodiment of the invention, the beams of electromagnetic waves are emitted to the surface from an altitude close to 500 km and scan over the surface approximately 100 km wide strips to the right and to the left of the ground trace of the track.

BRIEF DESCRIPTION OF THE DRAWINGS

One preferred embodiment of the invention will be described below as a non-limitative example with reference to the appended figures, wherein.

DETAILED DESCRIPTION OF THE PREFERRED EMBODIMENT(S)

Figure 2:
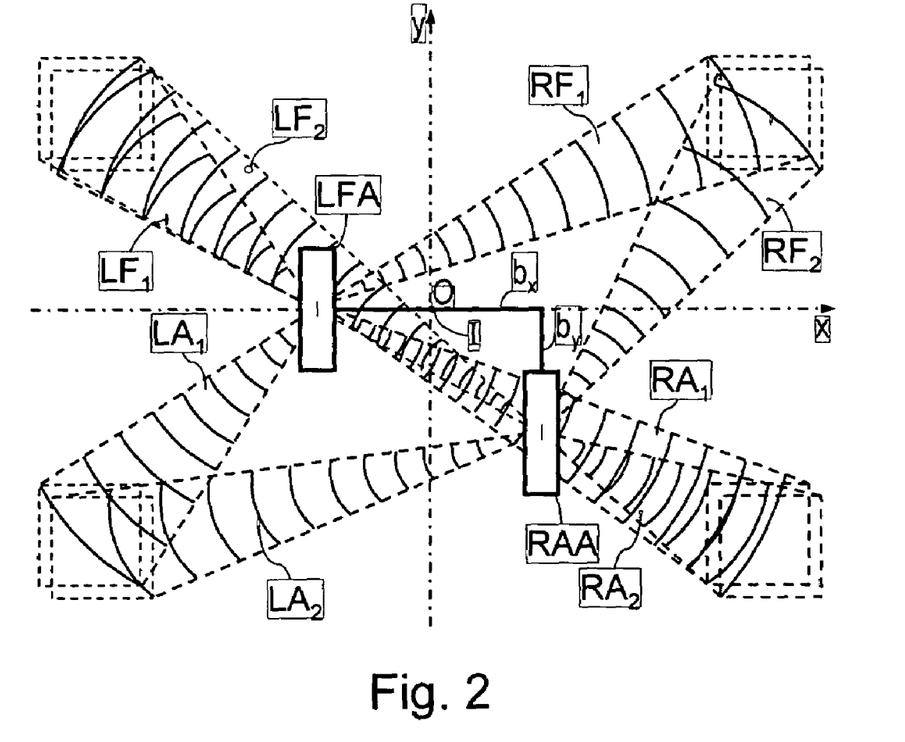
FIG. 2 diagrammatically shows a top view of an interferometric radar system according to the invention, and the shape of beams emitted by this system.

FIG. 2 shows an interferometric radar system according to the invention, this system being onboard a mobile platform (aircraft or satellite) moving along a track with a ground trace 10 along an axis Oy. This system comprises two antennas LFA, RAA at a spacing equal to a distance $b_x$ along a horizontal direction Ox perpendicular to the Oy axis.

According to the invention, the LFA, RAA antennas are also at a spacing equal to a distance $b_y$ along the $I_y$ direction of the track, where I is the mid-point of the antenna base along the Ix direction perpendicular to the track. Each of the two antennas LFA, RAA emits 4 beams RFi, LFi, RAi, LAi (i=1 and 2 respectively for the two antennas), namely a right forward beam $RF_i$ (right of the track), a left forward beam $LF_i$, a right aft beam $RA_i$, a left aft beam $LA_i$. Although FIG. 2 shows a left forward antenna LFA and a right aft antenna RAA, a right forward antenna and a left aft antenna could equally well be envisaged.

Figure 3:
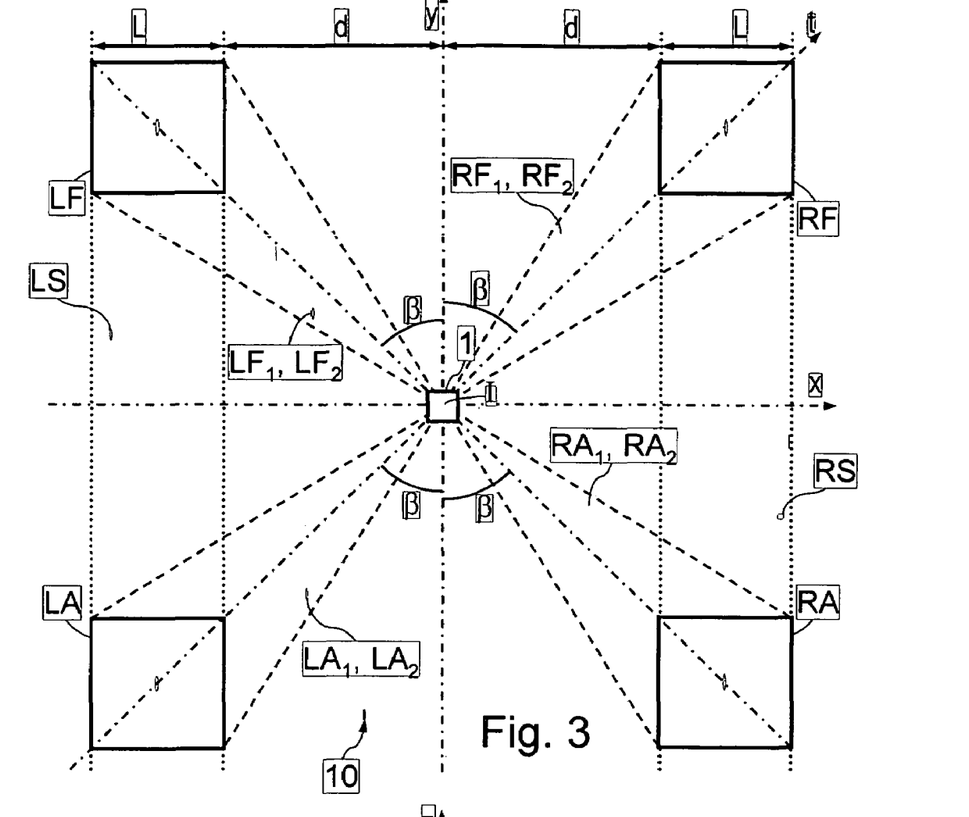
FIG. 3 diagrammatically shows a top view of the shape of beams emitted by the system shown in FIG. 2, and the trace of these beams on the ground.

In FIG. 3, the right forward, left forward, right aft and left aft beams output from platform 1 cover the RF, LF, RA, LA zones respectively on the ground 10 that scan the right and left strips or swaths RS, LS parallel to the Oy direction of the ground trace of the track. In the Oxy horizontal plane, the beams are oriented at an angle β with respect to the Oy direction of the track. The width L of each of the RS, LS strips is preferably about 100 km and they are at a distance d from the ground trace Oy of the track.

Figure 4:
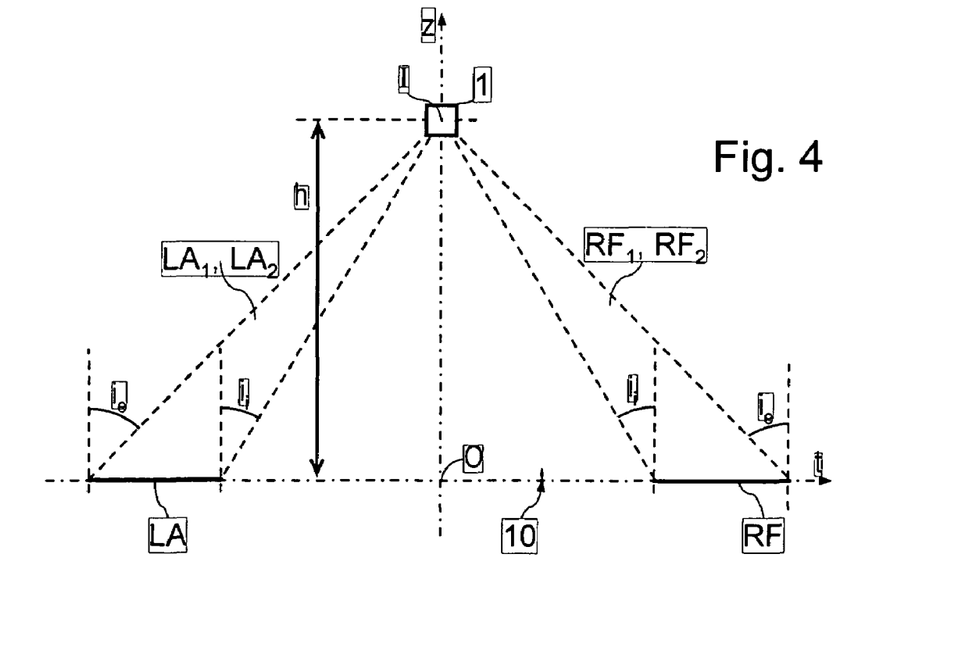
FIG. 4 shows the shape of the beams emitted by the system shown in FIG. 2, in a vertical plane.

FIG. 4 shows the shape and orientation of the right forward beam $RF_i$ and the left aft beam $LA_i$ (or the left forward beam $LF_i$ and the right aft beam $RA_i$) in a vertical plane Otz passing through the Ot axis connecting the corresponding centres of the RF and LA (or LF and RA) zones covered by these beams. This figure also shows the platform 1 on which the antennas LFA, RAA are installed that travels at a height h above the ground 10. As shown in this figure, the beams are at an angle of attack $i_t$ at the point in the RF, LF, RA, LA zones illuminated by the antennas closest to the platform 1.

According to one embodiment, the angles β and $i_t$ are close to 45° and 30° respectively. The result is that if the platform moves at an altitude h close to 500 km, the distance d between the ground trace Oy of the track and the inner edge of the RS and LS strips scanned by the beams is close to 187 km, and the angle of attack $i_e$ at the point in the RF, LF, RA, LA zones furthest from the platform 1 is close to 40°.

Figure 5:
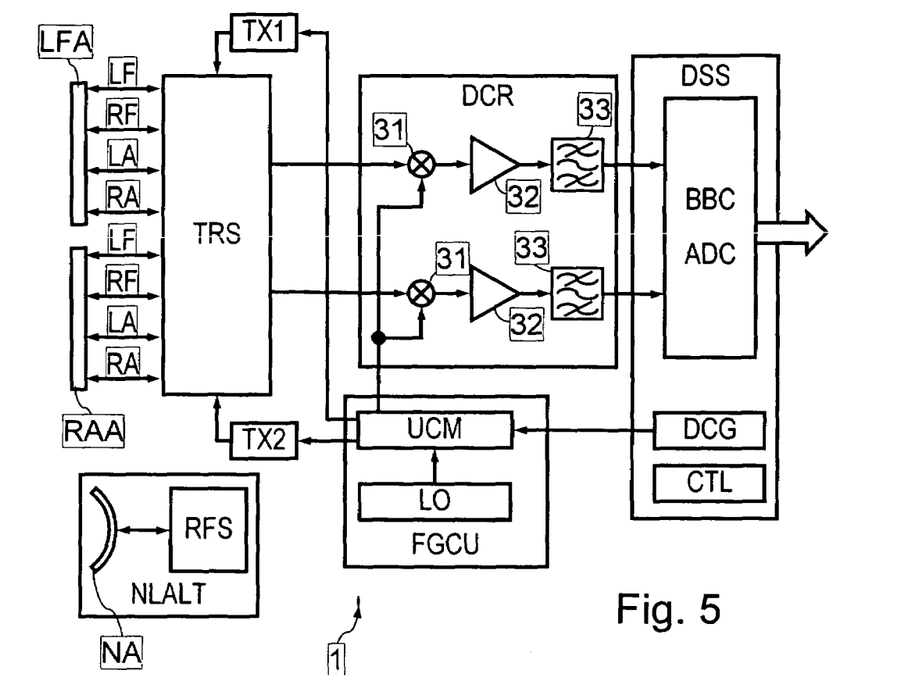
FIG. 5 shows a signal processing device according to the system shown in FIG. 2, in the form of a block diagram.

In FIG. 5, the system 1 according to the invention comprises a transmission/reception stage TRS connected to the LFA and RAA antennas, a dual channel reception stage DCR, a digital processing stage DSS, and a frequency generation and conversion stage FGCU.

The transmission/reception stage TRS includes an RF switch capable of switching between the transmission and reception and between the different beams to be emitted and received by the two antennas, and a Beam Forming Network supplying the antennas with signals to be emitted to produce the $RF_i$, $LF_i$, $RA_i$, $LA_i$ beams described above and preprocessing the reflected signals received by the antennas.

The dual-channel DCR reception stage comprises a mixer 31 for each reception channel, receiving a local oscillator signal at an intermediate frequency on one side and one of the signals received by an antenna on the other side, to convert the received signal into an intermediate frequency, and an amplifier 32 and a passband filter 33 centred on the intermediate frequency. The received signals, thus preprocessed by the reception stage, are applied to the input of the digital processing stage DSS.

The digital processing stage DSS performs analogue/digital conversion (ADC) of the received signals; phase detection for the conversion of base band signals and performs all functions necessary for acquisition, shaping and processing of the signals received. The digital processing stage also comprises a Digital Chirp Generator DCG to calculate and generate signals to be emitted and a CTL control stage for controlling and checking operation of the system assembly.

The FGCU frequency generation and conversion stage comprises local oscillators LO and a UCM stage for conversion and multiplication of the frequency of pulse signals output by the DCG generator using signals output by local oscillators. Pulse signals converted by the FGCU stage are applied to the TX1, TX2 transmitters that modulate signals received for example in the Ku band before sending them to the TRS stage.

Optionally, the system may also comprise an NLALT altimeter pointing towards the nadir, for example of the limited pulses type, comprising an antenna NA pointing towards the nadir, for example with double band Ku and S coupled to a signal processing RFS stage.

It may be advantageous to transmit different pulses at slightly different central frequencies for the left swath LS and the right swath RS, so as to facilitate chaining of pulses emitted by the right antenna LFA and the left antenna RAA of the system 1. All that is necessary then is to simply adapt the UCM frequency conversion and multiplication stage.

The system according to the invention can be used to obtain direct measurements of velocity vectors of these currents, particularly in coastal regions and regardless of their direction, instead of providing a simple topography of the surface 10 of oceans and deducing information about ocean currents based on models. It is also found that the antenna configuration according to the invention provides a means of obtaining useful information for calibrating the system, particularly the geometry of the system and its position in space.

Surface currents are measured using ATI (along-track interferometry). This type of interferometry is based on the fact that the image produced from the signals received by the forward antenna is offset from the image produced from the aft antenna by the duration τ taken by the system to travel the distance $b_y$ separating the antennas along the direction Oy of the track. Therefore this duration τ is equal to $b_y/v_s$ where $v_s$ is the velocity of the system. It is obvious that the two images of the same scene taken at slightly different times from the same point in space contain shifts in the observed phase due to the average Doppler speed $V_0$, resulting from reflecting points that move in the radial direction with respect to the system. This Doppler speed can be determined by a cross-correlation using the following formula:

$$v_0 = \frac{\lambda}{2} \frac{\arg\langle A_1(t)A_2^*(t+\tau)\rangle}{2\pi\tau} \quad (1)$$

in which λ is the radar frequency, and $A_1$ and $A_2$ are complex signals received by the two antennas, * symbolising the complex conjugate operation and arg< > being the complex operation giving the argument of a complex number.

Non-ambiguous values of the phase belong to the [−π, π] interval corresponding to the range of non-ambiguous values of the Doppler frequency [−λ/4Σ, λ/4τ]. It is assumed that only one of the two antennas emits and receives while the other antenna only receives. If the two antennas emit and receive alternately, the distance $b_y$ separating the two antennas to be considered is doubled.

To a large extent, the distance $b_y$ between the two antennas along the track line determines the capability of the interferometer to determine surface current velocity vectors. If this distance is too small, time sampling is insufficient, and therefore estimates of Doppler velocities are noisy. If this distance is too high, the time interval between the two observations is too long to make a time correlation. Document [4] "Dual-Beam Interferometry for Ocean Surface Current Vector Mapping", S. J. Frasier and A. J. Camps, IEEE Transactions on Geoscience and Remote Sensing, Vol. 39, No. 2, pp. 401-414, February 2001, suggests that the coherence time τs of the beam reflected by the ocean surface for slight to moderate resolutions and wind velocities (resolution about 30 m and wind velocities less than 8 m/s), is approximately 3λ/u, where u is the wind velocity.

The Siegmund et al. article discussed hereinbefore describes a method for obtaining surface current velocity measurements of the order of a few tens of centimetres per second, to determine a distance $b_y$ between the two antennas along the axis of the track adapted to the fixed target resolution. This result was achieved with two SAR antennas onboard an aircraft at an altitude of 3200 m and working in the X frequency band, the antennas being at a spacing of only 3.4 cm along the axis of the track. This precision for an instrument placed on a satellite at an altitude of 500 km and operating in the Ku frequency band, can be obtained with a distance $b_y$ equal to 3.7 m.

Figure 6:
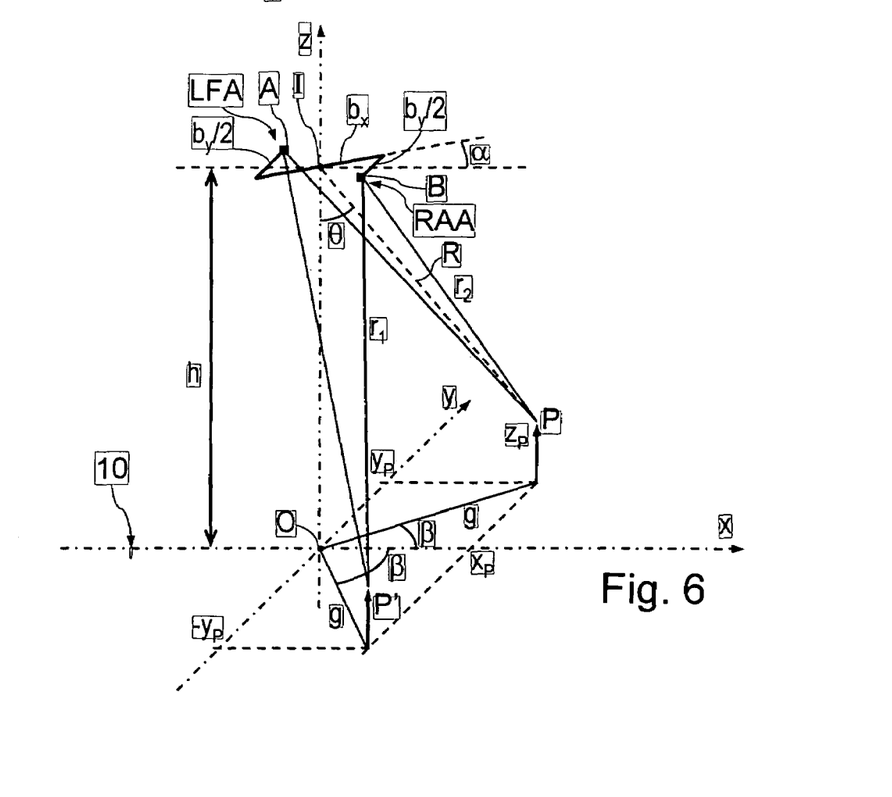
FIG. 6 shows a perspective view of the system shown in FIG. 2.

The system according to the invention can also be used to determine the surface topography of oceans using an XTI (cross-track type interferometry). Since the beams emitted by the system are oriented backwards and forwards from the system along an angle β chosen for example approximately equal to 45°, the beam vector is not perpendicular to the direction of the track, but this does not affect the geometric analysis for the XTI interferometry. The purpose of this interferometry is to determine the elevation z of a point P above a reference plane Oxy as shown in FIG. 6. The satellite on which the system is onboard moves along the Oy direction at an altitude h and emits beams on each side of the track at an angle β. The phase centres of the LFA and RAA antennas are at a spacing equal to the distance $b_x$ along the direction Ox perpendicular to the direction Oy of the track. If only one of the two antennas emits alternately and both receive the rays reflected by the surface, the phase shift between the reflected signals received by the two antennas, also called the "interferometric phase φ", is given by the following formula:

$$\varphi = 2\pi \frac{(r_2 - r_1)}{\lambda} \quad (2)$$

in which λ is the wavelength of the signal emitted in pulse form, $r_1$ and $r_2$ are the corresponding distances between the point P considered and the phase centres of the two antennas.

Formula (2) can be expressed as a function of the geometry of the antennas as follows:

$$\varphi = \frac{2\pi b_x}{\lambda} \sin(\theta - \alpha) \quad (3)$$

in which θ is the angle of attack of the beam emitted to point P and α is the roll angle or the inclination of the antenna base with length $b_x$, with regard to a horizontal plane (parallel to the Oxy plane).

The position of the point P is given by the following formulas:

$$X_P = R \sin\theta \sin\beta \quad (4)$$

$$Y_P = R \sin\theta \cos\beta \quad (5)$$

$$Z_P = h - R \cos\theta \quad (6)$$

in which R is the distance said to be "oblique" separating the middle of the antenna base from point P.

According to formulas (2) to (6), the interferometric phase can be used to determine the oblique distance R, the angle of attack θ and the position in space of a reflecting point, from a plane.

The precision of the elevation $z_P$ of a reflecting point P, which is necessary for most oceanic altimetric applications, is of the order of 2 cm. Therefore it is essential to maintain error sources to their minimum level. According to formulas (2) to (6), errors δz in the measurement of the elevation can originate from uncertainties about the evaluation of the following magnitudes:

antenna altitude h: $\delta z_1 = \delta h$ the oblique distance: $\delta z_2 = -R \cos\theta \cdot \delta R$ the roll angle of the antenna base: $\delta Z_3 = R \sin\theta \cdot \delta\alpha$ the length bx of the antenna base:

$$\delta z_4 = -R\sin\theta \cdot \tan(\theta - \alpha) \frac{\delta b_x}{b_x}, \text{ and}$$

the interferometric phase:

$$\delta z_5 = R \frac{\lambda \sin\theta}{2\pi \, b_x \cos(\theta - \alpha)} \delta\varphi.$$

The altitude evaluation error δh of the system when it is onboard the satellite, is dominated by orbit errors. This error is typically less than a few centimetres for Earth observation missions.

The oblique distance evaluation error δR is due to the conversion of time measurements on radar signals into geometric distances. These errors are mainly the result of jitter errors in the system local oscillator. The jitter of oscillators onboard existing systems is less than a few picoseconds. Therefore this error is negligible.

However, uncertainties on the evaluation of the length $b_x$ and the roll angle α of the antenna base are critical. It is evaluated that an error βB equal to 0.1 mm on the evaluation of the length $b_x$ will result in an elevation error $\delta z_4$ equal to 2.35 m for the points furthest from the track. A roll angle error δα equal to 1 second of arc leads to an elevation error $\delta z_3$ equal to 1.73 m for the points furthest from the track.

The interferometric phase must be known with an error δφ less than 0.02° to achieve a precision of the order of a few centimetres.

Due to the fact that two antennas in the system emit four beams each, two phase shift diagrams (interferograms) can be produced for each of the left and right swaths (LS, RS) (four interferograms in total). If it is assumed that the average depth of the ocean (for example in a 1 km×1 km region) does not change with time between maps made using the forward and aft beams, the phase shifts (differential interferometry) detected between the forward and aft interferograms are due to errors in the attitude of the satellite carrying the system or the antenna base roll angle. It should be noted that this consideration is only true if the antenna base comprises an along-track component $b_y$ and a cross-track component $b_x$. Furthermore, it can be observed that an error detected between the left interferograms is equal in amplitude and opposite in sign to the error detected between the right interferograms. This observation confirms that such errors are due to the uncertainty in the evaluation of the roll angle of the antenna base.

For the forward beams $RF_1$, $RF_2$, $LF_1$, $LF_2$ from the right and left antennas, let $\phi_{FRR}(x_i,y_j)$ and $\phi_{FRL}(x_i,y_j)$ represent the phase of the pixel $(x_i, y_j)$ located on the right swath RS, and let $\phi_{FLR}(x'_i,y'_j)$ and $\phi_{FLL}(x'_i,y'_j)$ represent the phase of the pixel $(x'_i, y'_j)$ located on the left swath LS. Similarly, for the aft beams $RA_1$, $RA_2$, $LA_1$, $LA_2$ and for the same pixels, let $\phi_{ARR}(x_i,y_j)$, $\phi_{ARL}(x_i,y_j)$, $\phi_{ALR}(x'_i,y'_j)$ and $\phi_{ALL}(x'_i,y'_j)$ represent the corresponding phases of pixels $(x_i, y_j)$ and $(x'_i, y'_j)$ located on the right and left swaths. The interferogram generated between the right and left forward beams $RF_1$, $RF_2$ for the right swath RS is of the following form:

$$\delta\phi_{FR}(x_i,y_j)=|\phi_{FRR}(x_i,y_j)-\phi_{FRL}(x_i,y_j)| \tag{7}$$

This interferogram depends mainly on the antenna base length $b_x$ along the cross-track direction of the system and the local altitude of the surface sea.

For beams on the other side and at the back, interferograms of the following form are obtained in a similar manner:

$$\delta\phi_{FL}(x'_i,y'_j)=|\phi_{FLR}(x'_i,y'_j)-\phi_{FLL}(x'_i,y'_j)| \tag{8}$$

$$\delta\phi_{AR}(x_i,y_j)=|\phi_{ARR}(x_i,y_j)-\phi_{ARL}(x_i,y_j)| \tag{9}$$

$$\delta\phi_{AL}(x'_i,y'_j)=|\phi_{ALR}(x'_i,y'_j)-\phi_{ALL}(x'_i,y'_j)| \tag{10}$$

The differential interferograms for interferograms on the same side are determined as follows:

$$\delta\delta\phi_R(x_i,y_j)=|\delta\phi_{FR}(x_i,y_j)-\delta\phi_{AR}(x_i,y_j)| \text{ and} \tag{11}$$

$$\delta\delta\phi_L(x'_i,y'_j)=|\delta\phi_{FL}(x'_i,y'_j)-\delta\phi_{AL}(x'_i,y'_j)| \tag{12}$$

If it is always assumed that the average altitude of the surface sea has not changed during the time interval between forward and aft acquisitions (differential interferograms are usually used to detect surface changes), then these differential interferograms only contain information about geometric differences between the left and right antennas.

This information is extracted by determining equivalent differential interferograms $\delta\delta_{\phi R\ ref}(x_i,y_j)$ and $\delta\delta_{\phi L\ ref}(x'_i,y'_j)$ for a reference system without any attitude errors, and the differences between differential interferograms determined by measurements and reference interferograms can then be calculated:

$$\delta\delta\delta\phi_{R\ geom}(x_i,y_j)=|\delta\delta\phi_R(x_i,y_j)-\delta\delta\phi_{R\ ref}(x_i,y_j)| \tag{13}$$

$$\delta\delta\delta\phi_{L\ geom}(x'_i,y'_j)=|\delta\delta\phi_L(x'_i,y'_j)-\delta\delta\phi_{L\ ref}(x_i,y_j)| \tag{14}$$

The reference differential interferograms may be obtained using the Digital Elevation Model (DEM) generated from forward and aft beams that provide two sets of independent measurements of the same surface.

In FIG. 6, the point P is positioned on the right swath together with a point P' that is the same as point P but seen by the aft beams $RA_1$ and $RA_2$ after a system travel time t. If it is assumed that points P and P' are at altitude $0(Z_P=0)$ and that the angle $\beta$ is equal to 45°, the points I, P, P' and the antennas LFA and RAA centered on points A and B respectively have the following coordinates given in the Oxyz coordinate system:

$$A=\left(\frac{b_x}{2},\frac{b_y}{2},h\right) \tag{15}$$

$$B=\left(-\frac{b_x}{2},-\frac{b_y}{2},h\right) \tag{16}$$

$$P=\left(\frac{g}{\sqrt{2}},\frac{g}{\sqrt{2}},0\right) \tag{17}$$

$$P'=\left(\frac{g}{\sqrt{2}},-\frac{g}{\sqrt{2}},0\right) \tag{18}$$

$$I=(0,0,h) \tag{19}$$

where g is the distance between point O and point P or P'.

The result is that the coordinates of the $\overrightarrow{AP}, \overrightarrow{BP}, \overrightarrow{AP'}$ and $\overrightarrow{BP'}$ vectors are as follows:

$$\overrightarrow{AP}=\left(\frac{g}{\sqrt{2}}-\frac{b_x}{2},\frac{g}{\sqrt{2}}+\frac{b_y}{2},-h\right) \tag{20}$$

$$\overrightarrow{BP}=\left(\frac{g}{\sqrt{2}}+\frac{b_x}{2},\frac{g}{\sqrt{2}}-\frac{b_y}{2},-h\right) \tag{21}$$

$$\overrightarrow{AP'}=\left(\frac{g}{\sqrt{2}}-\frac{b_x}{2},\frac{b_y}{2}-\frac{g}{\sqrt{2}},-h\right) \tag{22}$$

$$\overrightarrow{BP'}=\left(\frac{g}{\sqrt{2}}+\frac{b_x}{2},-\frac{g}{\sqrt{2}}-\frac{b_y}{2},-h\right) \tag{23}$$

The lengths of these vectors are given by the following equations:

$$|\overrightarrow{AP}|=\left[\left(\frac{g}{\sqrt{2}}-\frac{b_x}{2}\right)^2+\left(\frac{b_y}{2}+\frac{g}{\sqrt{2}}\right)^2+h^2\right]^{\frac{1}{2}} \tag{24}$$

$$=\left[\frac{b_x^2+b_y^2}{4}+g^2+h^2-\frac{g}{\sqrt{2}}(b_x-b_y)\right]^{\frac{1}{2}}$$

$$|\overrightarrow{BP}|=\left[\left(\frac{g}{\sqrt{2}}+\frac{b_x}{2}\right)^2+\left(\frac{g}{\sqrt{2}}-\frac{b_y}{2}\right)^2+h^2\right]^{\frac{1}{2}} \tag{25}$$

$$=\left[\frac{b_x^2+b_y^2}{4}+g^2+h^2+\frac{g}{\sqrt{2}}(b_x-b_y)\right]^{\frac{1}{2}}$$

$$|\overrightarrow{AP'}|=\left[\left(\frac{g}{\sqrt{2}}-\frac{b_x}{2}\right)^2+\left(\frac{b_y}{2}-\frac{g}{\sqrt{2}}\right)^2+h^2\right]^{\frac{1}{2}} \tag{26}$$

$$=\left[\frac{b_x^2+b_y^2}{4}+g^2+h^2-\frac{g}{\sqrt{2}}(b_x+b_y)\right]^{\frac{1}{2}}$$

$$|\overrightarrow{BP'}|=\left[\left(\frac{g}{\sqrt{2}}+\frac{b_x}{2}\right)^2+\left(\frac{-g}{\sqrt{2}}-\frac{b_y}{2}\right)^2+h^2\right]^{\frac{1}{2}} \tag{27}$$

$$=\left[\frac{b_x^2+b_y^2}{4}+g^2+h^2+\frac{g}{\sqrt{2}}(b_x+b_y)\right]^{\frac{1}{2}}$$

Equations (24) and (25) provide the means of deducing the phase shift $\delta\phi_{FR\ ref}$ at point P, in other words the interferogram at point P as seen from the forward and aft antennas LFA and RAA:

$$\delta\phi_{FR\ ref}= \tag{28}$$

$$\frac{2\pi}{\lambda}\left\{\left[\frac{b_x^2+b_y^2}{4}+g^2+h^2-\frac{g}{\sqrt{2}}(b_x-b_y)\right]^{\frac{1}{2}}-\right.$$

$$\left.\left[\frac{b_x^2+b_y^2}{4}+g^2+h^2+\frac{g}{\sqrt{2}}(b_x-b_y)\right]^{\frac{1}{2}}\right\}$$

where $\lambda$ is the wavelength.

Similarly, equations (26) and (27) can be used to deduce the phase shift $\delta\phi_{AR\ ref}$ in other words the interferogram at point P' seen from the forward and aft antennas LFA and RAA $$\delta\phi_{AR\,ref} = \frac{2\pi}{\lambda}\left\{\left[\frac{b_x^2+b_y^2}{4}+g^2+h^2-\frac{g}{\sqrt{2}}(b_x+b_y)\right]^{\frac{1}{2}} - \left[\frac{b_x^2+b_y^2}{4}+g^2+h^2+\frac{g}{\sqrt{2}}(b_x+b_y)\right]^{\frac{1}{2}}\right\} \quad (29)$$

The difference between these two interferograms can be used to obtain the theoretical differential interferogram defined by the following formula:

$$\delta\delta\phi_{R\,ref} = \quad (30)$$

$$|\delta\phi_{FR\,ref} - \delta\phi_{AR\,ref}| = \frac{2\pi}{\lambda}\left\{\left[\frac{b_x^2+b_y^2}{4}+g^2+h^2-\frac{g}{\sqrt{2}}(b_x-b_y)\right]^{\frac{1}{2}} - \left[\frac{b_x^2+b_y^2}{4}+g^2+h^2+\frac{g}{\sqrt{2}}(b_x-b_y)\right]^{\frac{1}{2}} - \left[\frac{b_x^2+b_y^2}{4}+g^2+h^2-\frac{g}{\sqrt{2}}(b_x+b_y)\right]^{\frac{1}{2}} + \left[\frac{b_x^2+b_y^2}{4}+g^2+h^2+\frac{g}{\sqrt{2}}(b_x+b_y)\right]^{\frac{1}{2}}\right\}$$

If there is an error $\delta b_x$ in the evaluation of the length $b_x$ of the antenna base, the differential interferogram $\delta\delta\phi_{Rb\,ref}$ may be deduced from the following equation, taking account of this error:

$$\delta\delta\phi_{Rb} = |\delta\phi_{FRb} - \delta\phi_{ARb}| = \quad (31)$$

$$\frac{2\pi}{\lambda}\left\{\left[\frac{(b_x+\delta b_x)^2+b_y^2}{4}+g^2+h^2-\frac{g}{\sqrt{2}}((b_x+\delta b_x)-b_y)\right]^{\frac{1}{2}} - \left[\frac{(b_x+\delta b_x)^2+b_y^2}{4}+g^2+h^2+\frac{g}{\sqrt{2}}((b_x+\delta b_x)-b_y)\right]^{\frac{1}{2}} - \left[\frac{(b_x+\delta b_x)^2+b_y^2}{4}+g^2+h^2-\frac{g}{\sqrt{2}}((b_x+\delta b_x)+b_y)\right]^{\frac{1}{2}}\right\}$$

The above equations can be used to determine the difference between the differential interferogram $\delta\delta\phi_{Rb\,ref}$ with an error in the evaluation of the length of the antenna base and the theoretical differential interferogram $\delta\delta\phi_{Rb\,ref}$ (without an error in the evaluation of the length of the antenna base and the roll angle).

If we now assume that there is no error in the evaluation of the base length $b_x$ of the antennas, but that there is an error in the roll angle $\alpha$ in the position of the antenna base, the corresponding positions of the antennas LFA and RAA centered on points A and B respectively have the following coordinates given in the Oxyz coordinate system:

$$A = \left(\frac{b_x}{2}\cos\alpha, -\frac{b_y}{2}, h+\sin\alpha\right) \quad (32)$$

$$B = \left(-\frac{b_x}{2}\cos\alpha, \frac{b_y}{2}, h-\sin\alpha\right) \quad (33)$$

The result is that the coordinates of the $\overrightarrow{AP}, \overrightarrow{BP}, \overrightarrow{AP'}$ and $\overrightarrow{BP'}$ vectors are as follows:

$$\overrightarrow{AP} = \left(\frac{g}{\sqrt{2}}-\frac{b_x}{2}\cos\alpha, \frac{g}{\sqrt{2}}+\frac{b_y}{2}, -h-\sin\alpha\right) \quad (34)$$

$$\overrightarrow{BP} = \left(\frac{g}{\sqrt{2}}+\frac{b_x}{2}\cos\alpha, \frac{g}{\sqrt{2}}-\frac{b_y}{2}, -h+\sin\alpha\right) \quad (35)$$

$$\overrightarrow{AP'} = \left(\frac{g}{\sqrt{2}}-\frac{b_x}{2}\cos\alpha, \frac{b_y}{2}-\frac{g}{\sqrt{2}}, -h-\sin\alpha\right) \quad (36)$$

$$\overrightarrow{BP'} = \left(\frac{g}{\sqrt{2}}+\frac{b_x}{2}\cos\alpha, -\frac{g}{\sqrt{2}}-\frac{b_y}{2}, -h+\sin\alpha\right) \quad (37)$$

The lengths of these vectors can be deduced from their coordinates as follows:

$$|\overrightarrow{AP}| = \left[\left(\frac{g}{\sqrt{2}}-\frac{b_x}{2}\cos\alpha\right)^2 + \left(\frac{b_y}{2}+\frac{g}{\sqrt{2}}\right)^2 + (h+\sin\alpha)^2\right]^{\frac{1}{2}} = \quad (38)$$

$$\left[\frac{b_x^2\cos^2\alpha+b_y^2}{4}+g^2+h^2+2h\sin\alpha+\sin^2\alpha-\frac{g}{\sqrt{2}}(b_x\cos\alpha-b_y)\right]^{\frac{1}{2}}$$

$$|\overrightarrow{BP}| = \left[\left(\frac{g}{\sqrt{2}}+\frac{b_x}{2}\cos\alpha\right)^2 + \left(\frac{g}{\sqrt{2}}-\frac{b_y}{2}\right)^2 + (-h+\sin\alpha)^2\right]^{\frac{1}{2}} = \quad (39)$$

$$\left[\frac{b_x^2\cos^2\alpha+b_y^2}{4}+g^2+h^2-2h\sin\alpha+\sin^2\alpha+\frac{g}{\sqrt{2}}(b_x\cos\alpha-b_y)\right]^{\frac{1}{2}}$$

$$|\overrightarrow{AP'}| = \left[\left(\frac{g}{\sqrt{2}}-\frac{b_x}{2}\cos\alpha\right)^2 + \left(\frac{b_y}{2}-\frac{g}{\sqrt{2}}\right)^2 + (h+\sin\alpha)^2\right]^{\frac{1}{2}} = \quad (40)$$

$$\left[\frac{b_x^2\sin^2\alpha+b_y^2}{4}+g^2+h^2+2h\sin\alpha+\sin^2\alpha-\frac{g}{\sqrt{2}}(b_x\cos\alpha+b_y)\right]^{\frac{1}{2}}$$

$$|\overrightarrow{BP'}| = \left[\left(\frac{g}{\sqrt{2}}+\frac{b_x}{2}\cos\alpha\right)^2 + \left(\frac{-g}{\sqrt{2}}-\frac{b_y}{2}\right)^2 + (-h+\sin\alpha)^2\right]^{\frac{1}{2}} = \quad (41)$$

$$\left[\frac{b_x^2\cos^2\alpha+b_y^2}{4}+g^2+h^2-2h\sin\alpha+\sin^2\alpha+\frac{g}{\sqrt{2}}(b_x\cos\alpha+b_y)\right]^{\frac{1}{2}}$$

The interferogram $\delta\phi_{FRr}$ at point P of the forward and aft antennas LFA and RAA is defined by the following equations:

$$\delta\phi_{FRr} = \frac{2\pi}{\lambda}\left\{\left[\frac{b_x^2\cos^2\alpha+b_y^2}{4}+g^2+h^2+2h\sin\alpha+\sin^2\alpha-\frac{g}{\sqrt{2}}(b_x\cos\alpha-b_y)\right]^{\frac{1}{2}} - \left[\frac{b_x^2\cos^2\alpha+b_y^2}{4}+g^2+h^2-2h\sin\alpha+\sin^2\alpha+\frac{g}{\sqrt{2}}(b_x\cos\alpha-b_y)\right]^{\frac{1}{2}}\right\} \quad (42)$$

Similarly, the interferogram $\delta\phi_{ARr}$ at point P' seen from the forward and aft antennas LFA and RAA is defined by the following equations:

$$\delta\phi_{ARr} = \frac{2\pi}{\lambda}\left\{\left[\frac{b_x^2\cos^2\alpha + b_y^2}{4} + g^2 + h^2 + 2h\sin\alpha + \sin^2\alpha - \frac{g}{\sqrt{2}}(b_x\cos\alpha + b_y)\right]^{\frac{1}{2}} - \left[\frac{b_x^2\cos^2\alpha + b_y^2}{4} + g^2 + h^2 - 2h\sin\alpha + \sin^2\alpha + \frac{g}{\sqrt{2}}(b_x\cos\alpha + b_y)\right]^{\frac{1}{2}}\right\} \quad (43)$$

The difference between the above two interferograms can be used to obtain the expected differential interferogram defined by the following formula:

$$\delta\delta\phi_{Rr} = \quad (44)$$

$$|\delta\phi_{FRr} - \delta\phi_{ARr}| = \frac{2\pi}{\lambda}\left\{\left[\frac{b_x^2\cos^2\alpha + b_y^2}{4} + g^2 + h^2 + 2h\sin\alpha + \sin^2\alpha - \frac{g}{\sqrt{2}}(b_x\cos\alpha - b_y)\right]^{\frac{1}{2}} - \left[\frac{b_x^2\cos^2\alpha + b_y^2}{4} + g^2 + h^2 - 2h\sin\alpha + \sin^2\alpha + \frac{g}{\sqrt{2}}(b_x\cos\alpha - b_y)\right]^{\frac{1}{2}} - \left[\frac{b_x^2\cos^2\alpha + b_y^2}{4} + g^2 + h^2 + 2h\sin\alpha + \sin^2\alpha - \frac{g}{\sqrt{2}}(b_x\cos\alpha + b_y)\right]^{\frac{1}{2}} + \left[\frac{b_x^2\cos^2\alpha + b_y^2}{4} + g^2 + h^2 - 2h\sin\alpha + \sin^2\alpha + \frac{g}{\sqrt{2}}(b_x\cos\alpha + b_y)\right]^{\frac{1}{2}}\right\}$$

The above equations can be used to determine the difference $\delta\delta\delta\phi_{Rgeom}$ between the differential interferogram $\delta\delta\phi_{Rr}$ taking account of an error in the roll angle $\alpha$ in the position of the antenna base or the interferogram $\delta\delta\phi_{Rb}$ taking account firstly of an error in the evaluation of the length $b_x$ of the antenna base, and secondly the theoretical differential interferogram $\delta\delta\phi_{R\_ref}$ in accordance with equation (13).

These equations show that by carrying out differential interferometries supplying differential interferograms, values of the roll angle $\alpha$ and the error $\delta b_x$, in estimating the value of the length $b_x$ of the antenna base along a horizontal direction perpendicular to the track, can be deduced.

Obviously, analogue equations can be formulated from a point located in the left swath LS.

Figure 7A:
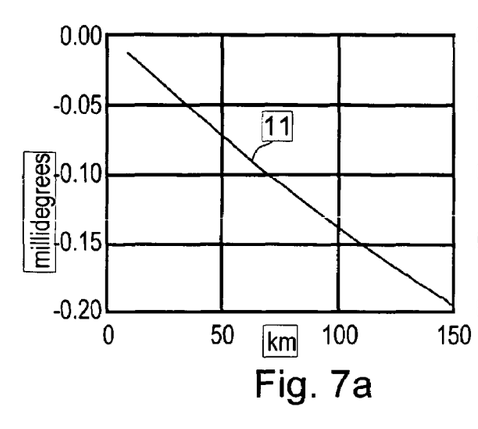
FIGS. 7a, 7b and 8a, 8b illustrate performances of the system shown in FIG. 2, in the form of curves.
Figure 7B:
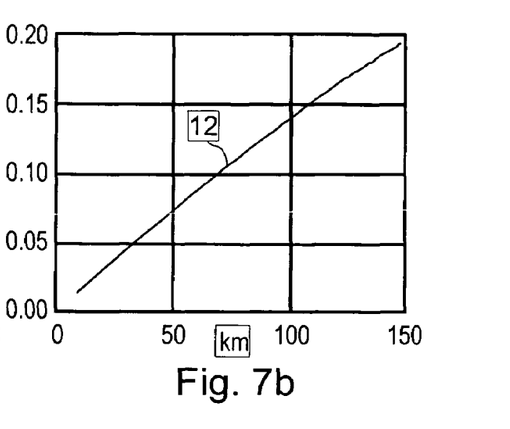
Figure 8A:
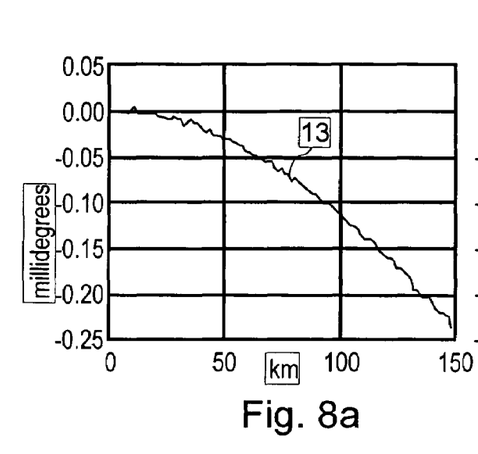
Figure 8B:
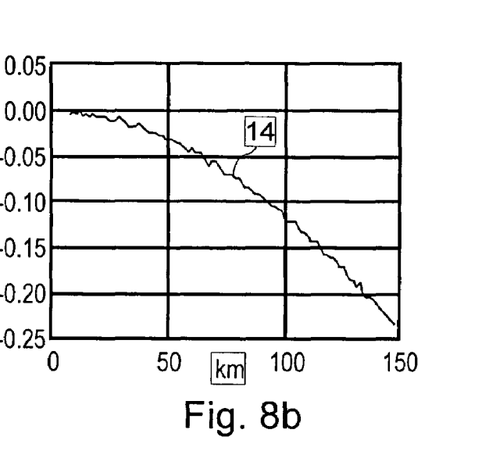

FIGS. 7 and 8 contain examples of results thus obtained for roll angle errors (FIGS. 7a and 7b) and antenna base length errors (FIGS. 8a and 8b). Curves 11 and 12 shown in FIGS. 7a and 7b give the impact of an error of 0.1° in the evaluation of the roll angle of the antenna base on the phase shift (in millidegrees) as a function of the distance to the ground (in km), for the left and right swaths respectively. Curves 13 and 14 give the impact of a 1 cm error in the evaluation of the antenna base length on the phase shift as a function of the distance to the ground, for the left and right swaths respectively. These curves show that forward and aft differential interferograms can be used to precisely determine the estimating error of the roll angle and the antenna base length.

Concerning the antenna base length, it is important to note that the estimate of the antenna base length is given from the phase center of one antenna to the phase center of the other antenna, and that such a length cannot be obtained using a distance measurement instrument, for example a laser.

Concerning other estimating errors of the attitude of the satellite carrying the system, it can be demonstrated that the impact of an error in estimating the yaw angle is of the order of four times less than an error in estimating the roll angle of the antenna base. Therefore this error can be neglected.

Another parameter to be considered is the signal to noise ratio, or in the application considered, the normalized radar cross section (NRCS) that varies as a function of the angle of attack and the wind velocity. Sufficient performances can be obtained with antennas of about 1 m² put into orbit at an altitude of 500 km and coupled to power amplifiers of about 600 W.

Therefore, the system according to the invention is designed to evaluate the roll angle and the antenna base length for each series of velocity vector measurements. The roll angle of the antenna base depends on the attitude of the satellite on which the system is onboard and therefore changes with the attitude of the satellite. The antenna base length is also continuously subjected to variations largely due to thermal expansion of the material from which the antenna base is made that is subject to large temperature variations.

The invention claimed is:

1. A method for producing map images of surface sea current velocity vectors, using a system running along a track above a surface of the sea, the method comprising the steps:
    emitting beams of eletromagnetic waves to the surface from at least two antennas at a distance from each other along a direction of the track and along a direction perpendicular to the track,
    making an along-track type differential interferometry using electromagnetic waves reflected by the surface, to build up map images of surface sea current velocity vectors,
    said beam emitting step comprising emitting the beams of electromagnetic waves ($LF_i$, $RF_i$, $LA_i$, $RA_i$, where i=1 and 2) in a left forward and right forward directions of the track and in a left aft and right aft directions of the track, further
    making differential interferometries between the beams emitted forward ($LF_i$, $RF_i$, i=1 and 2) and aft ($LA_i$, $RA_i$, i=1 and 2),
    determining values of roll angle and length of an antenna base connecting the at least two antennas, starting from the differential interferometries, and
    using the values of the roll angle and the length of the antenna base obtained to build up the map images of surface sea current velocity vectors.

2. The method according to claim 1, further comprising using the electromagnetic waves reflected by the surface to perform a cross-track type interferometry to build up map images of surface altitude, using the values of roll angle and antenna base length obtained.

3. The method according to claims 1, wherein said values determining step comprises determining the values of roll angle and antenna base length connecting the two antennas by comparing the differential interferometries between beams emitted forwards and aft, and towards the left and towards the right respectively, with differential interferometries obtained using an equivalent system without any roll angle and antenna base length estimating errors.

4. The method according to claim 1, wherein the electromagnetic wave emitting step comprises emitting the beams of electromagnetic waves to the surface at angles of attack of between 30° and 40° and orienting the beams in azimuth with respect to the track direction, forwards and aft by an angle of approximately 45°.

5. The method according to claim 1, wherein the emitting step comprises emitting the beams of electromagnetic waves to the surface from an altitude of approximately 500 km and scanning over the surface approximately 100 km wide strips to the right and to the left of the ground trace of the track.

6. A system for producing map images of surface sea current velocity vectors using a system passing along a track above a surface of a sea, comprising:
- at least two antennas at a distance from each other in an along-track direction and in a cross-track direction, and
- means for using electromagnetic waves reflected by the surface to create a differential along-track type interferometry to build up map images of surface sea current velocity vectors,
- means for using the at least two antennas to emit beams of electromagnetic waves towards a forward left and a forward right of the track and towards an aft left and an aft right of the track,
- means for carrying out differential interferometries between beams emitted forwards and aft,
- means for determining values of roll angle and antenna base length connecting the at least two antennas from the differential interferometries, and
- along-track type differential interferometry means for using roll angle and antenna base length values obtained to build up the map images of surface sea current velocity vectors.

7. The system according to claim 6, further comprising means for carrying out a cross-track type interferometry from the electromagnetic waves reflected by the surface, using the roll angle and the antenna base length values obtained to build up map images of the surface altitude.

8. The system according to claim 7, further comprising means for comparing differential interferometries between beams emitted forwards and aft, towards the right and to the left respectively, with differential interferometries obtained using an equivalent system with no estimating errors of roll angle and antenna base length to determine values of the roll angle and the antenna base length connecting the at least two antennas.

9. The system according to claim 6, wherein the beams of electromagnetic waves are emitted to the surface at angles of attack of between 30° and 40° and are oriented in azimuth with respect to the direction of the track towards the front and towards the back by an angle close to 45°.

10. The system according to claim 6, wherein the beams of electromagnetic waves are emitted to the surface from an altitude close to 500 km and scan over the surface approximately 100 km wide strips to the right and to the left of the ground trace of the track.

* * * * *